United States Patent

[11] 3,618,773

[72] Inventor Sten Jacquet
 Hagersten, Sweden
[21] Appl. No. 879,091
[22] Filed Nov. 24, 1969
[45] Patented Nov. 9, 1971
[73] Assignee Sten Jaquet AB
 Hagersten, Sweden
[32] Priority Dec. 2, 1968
[33] Sweden
[31] 16453/68

[54] WATER PURIFICATION APPARATUS
 3 Claims, 5 Drawing Figs.
[52] U.S. Cl. ................................................. 210/123,
 210/242, 210/256, 210/532
[51] Int. Cl. ........................................................ B01d 21/02
[50] Field of Search ............................................ 210/83,
 256, 519, 242, 532, 123

[56] References Cited
 UNITED STATES PATENTS

| | | | |
|---|---|---|---|
| 1,118,614 | 11/1914 | Allen ............................. | 210/519 X |
| 1,602,705 | 10/1926 | Riley et al. ..................... | 210/256 |
| 3,184,065 | 5/1965 | Bradford ....................... | 210/519 |
| 3,385,786 | 5/1968 | Klock ............................ | 210/256 X |

*Primary Examiner*—Michael Rogers
*Attorney*—Ira Milton Jones

ABSTRACT: Contaminated raw or waste water is delivered into at least one basin which is supported within a water-filled reservoir. The contaminated water in said basin is subjected to mechanical, biological and/or chemical purification, and the treated effluent is caused to overflow into the reservoir. The basin has a conical wall of supple nonporous material that yields readily to even slight movements of the water both internally and externally of the basin unit.

PATENTED NOV 9 1971 3,618,773

INVENTOR
Sten Jacquet
BY [signature]
ATTORNEY

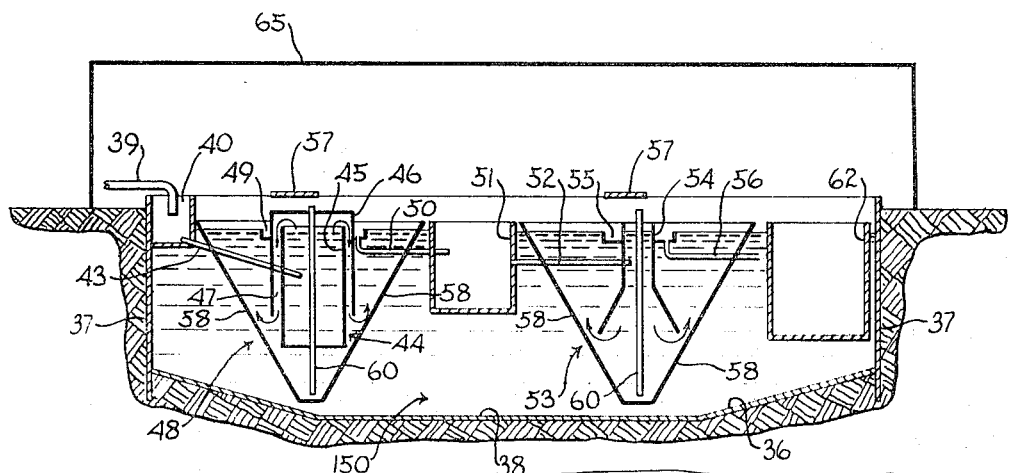
FIG. 3.
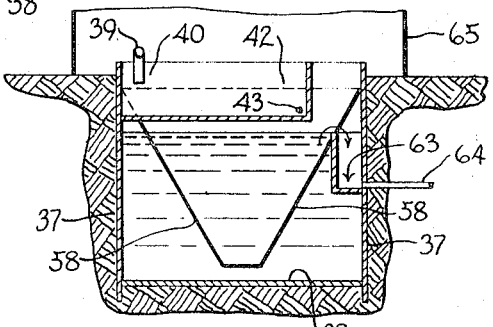
FIG. 5.
FIG. 4.
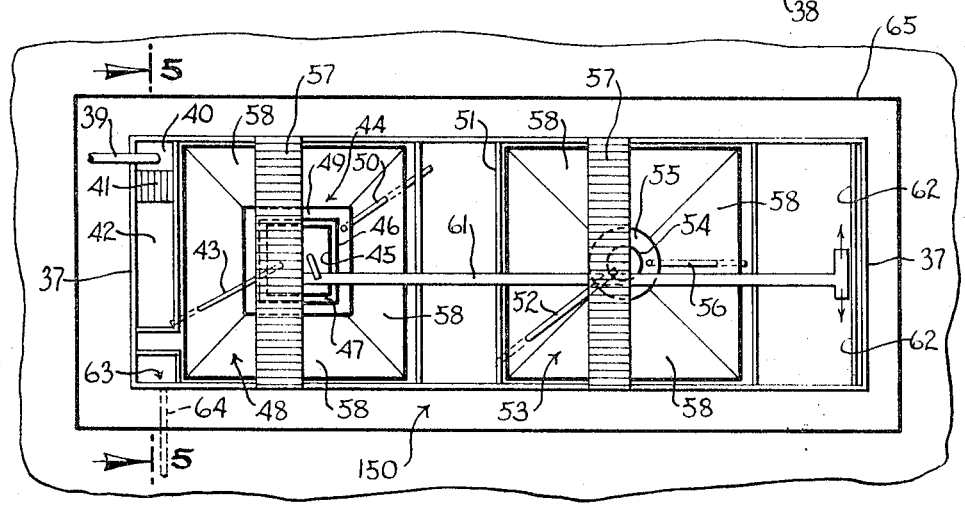

WATER PURIFICATION APPARATUS

This invention is concerned with sewage disposal and waste water purification problems.

In conventional sewage disposal and waste water purification plants the various basins and tanks that are an essential part of all such plants are customarily concrete and metal structures. Accordingly a large proportion of the cost of a water purification plant results from the expense involved in building and fabricating these basins and tanks.

The present invention eliminates the need for costly concrete and metal structures to receive and hold the contaminated water while it is undergoing treatment, by floating or otherwise suspending one or more basins formed of supple nonporous material in a body of water which may be a natural pond or small lake, or an inexpensive ground excavation. The contaminated water is delivered into the flexible walled basin or basins where the purification process is carried out. The sediment collects in the bottom of the basins, and treated clear water flows from the upper levels thereof into the body of water in which the basins are suspended.

While the use of flexible walled basins suspended in water is not per se new in sewage disposal and water purification plants, as evidenced by the Klock U.S. Pat. No. 3,385,786 heretofore the removal of the sludge from the basins presented a problem which was aggravated by the flexible nature of the basin walls. Obviously, of course, the sludge must be lifted or drawn from the basins without disturbing the relatively clear treated water in the uppermost portions of the basins, but in all prior attempts to substitute water-supported flexible walled basins for the rigid structures used in more conventional water purification plants, it was impossible to effect sludge removal without agitating and stirring up the basin contents. Due to the shape of the basins that were used in the past and the suppleness of their walls, any substantial disturbance either inside or outside of a basin resulted in such violent agitation of its contents that satisfactorily complete separation of the sediments and/or contaminants from the water undergoing treatment was well-nigh impossible. The present invention solves the problem heretofore presented by the use of supple-walled basins in sewage disposal and water purification plants by so shaping the basin walls that all portions thereof converge and slope downwardly to a zone of small volume at the bottom of the basin from which sludge can be readily removed.

The resulting absence of a large flat or substantially flat bottom wall precludes accumulation of sludge over areas and on surfaces from which it cannot be removed except by severe flexure of the basin walls, and instead makes it possible to continuously draw the accumulating sludge from the basin by a suction pump having the mouth of its intake tube fixedly mounted in the small volume bottom portion of the basin.

Since it is important in avoiding rolling of accumulated sediment in the basin or basins that their bottoms should not be displaced, it is also an object of the invention to maintain the water in which the basin or basins are floatingly suspended at a constant level, to assure that their bottoms will be supported well above the bottom of the pond, lake or reservoir.

The maintenance of a constant level of the water in the reservoir is also advantageous in that it enables the basin to be fixedly suspended therein without danger of excessive strain upon its relatively thin walls, such as would otherwise result if the water level in the reservoir dropped by any appreciable amount.

With these observations and objectives in mind, the manner in which the invention achieves its purpose will be appreciated from the following description and the accompanying drawings, which exemplify the invention, it being understood that such changes in the precise method of practicing the invention and in the specific apparatus disclosed herein may be made as come within the scope of the appended claims.

The accompanying drawings illustrate two complete examples of the embodiments of the invention constructed according to the best modes so far devised for the practical application of the principles thereof, and in which:

FIG. 3 is a diagrammatic view of another embodiment of the invention in which a pair of basin units are fixedly suspended in the reservoir;

FIG. 4 is a plan view of the plant shown in FIG. 3; and

FIG. 5 is a fragmentary sectional detail view taken on the line 5—5 in FIG. 4.

Figure 1:
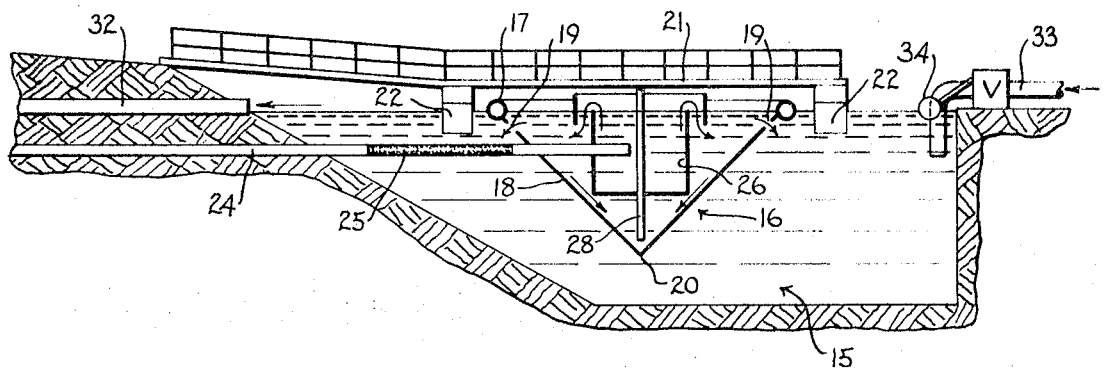
FIG. 1 is a diagrammatic view of a reservoir-type water purification plant embodying this invention.
Figure 2:
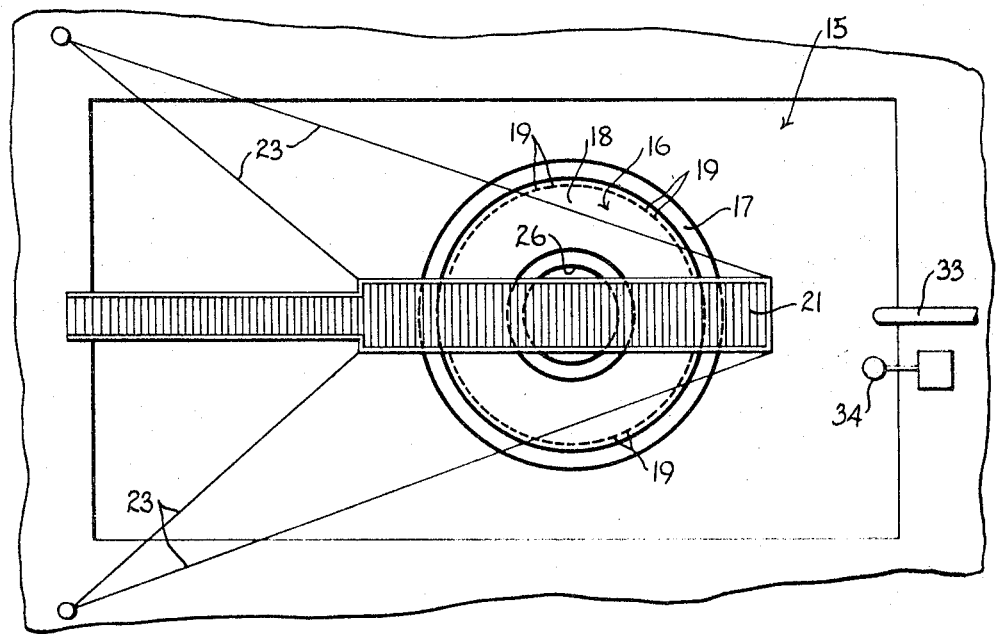
FIG. 2 is a plan view of the plant seen in FIG. 1.

Referring now to the accompanying drawings, and in particular to FIGS. 1 and 2, the reference numeral 15 denotes an artificially produced reservoir which is in the form of an excavation that more or less defines a pit. The reservoir has walls that are substantially water tight, and it is filled with water that is substantially free of contaminants.

A basin 16 having walls formed of supple nonporous material is positioned within the reservoir, and contaminated water is treated therein. The basin is supported in the reservoir water as by means of a circular flotation collar 17 secured to the rim at the upper edge of its sidewall 18. To give the basin the desired suppleness and nonporous quality, its wall 18 is preferably made of a plastic material based on polyvinyl chloride reinforced by fabric.

Outlet openings 19 are provided in the upper edge portion of the basin wall 18 at a slight distance below the flotation collar 17, through which the substantially clear water that obtains in the top portion of the basin flows into the reservoir. To guard against the passage of any debris that may be floating on the surface in the basin, the openings 19 may be placed far enough below water level to assure that only clear water from below the surface will be transferred to the reservoir. In the embodiment shown in FIGS. 1 and 2, the basin 16 has a purely inverted conical shape, so that its sidewall 18 converges towards the apex 20 of the cone, at the lowermost point of the basin.

Associated with the plant is a bridge 21 supported over the reservoir on floats 22 that are retained in position within the reservoir by means of anchoring wires 23.

Sewage or waste water to be treated is supplied to the basin 16 through a conduit 24 having a flexible portion 25 adjacent to the basin to minimize such movements of its sidewall as are caused by bodily motion of the basin relative to the rigid outer portion 24 of the conduit. In the embodiment shown, the conduit for the waste water extends into the center of the basin unit 16 and opens into a chamber 26 therein, in which chemical or biological purification of the influent is effected in a known manner. Water thus treated in the chamber 26 overflows therefrom into the basin 16, where the solids sink to the bottom. Alternatively, such water can be recycled as return sludge into the chamber 26.

When the solids or sediment gravitates towards the bottom of the basin 16 it will to some extent come in contact with the inner surfaces of the basin sidewall 18 and tend to form a gradually growing layer thereon. This layer would continue to build up in a basin having rigid walls of sheet plate or concrete, but in the present case, the normal motion of the water in the basin and/or in the surrounding body of water will continuously impart more or less gentle undulatory movements or deflections to the basin wall to discourage accumulation of sediment thereon. Instead, such gentle movements will promote sliding of sediment along the downwardly convergent sidewall 18 of the basin to the small bottom portion thereof, from whence it can be most effectively drawn off by means of a pump (not shown) having its suction tube 28 extending down into the basin with its mouth near the apex of its conical sidewall. The sludge thus withdrawn from the basin is delivered in any suitable way to a sludge drying bed or area.

In the operation of the plant, the withdrawal of sludge from the basin is so regulated with respect to the volume of contaminated water entering the same, that the basin is always kept full, with clear relatively uncontaminated water flowing into the reservoir from the basin outlets 19. Hence the internal and external pressures on the wall of the basin will be substantially equal and the elevation of the basin in the body of water in which it is floatingly suspended will remain substantially fixed. Damaging strains on the thin wall of the basin is impossible since the internal pressure can never exceed the external pressure, and if perchance the withdrawal of sludge proceeds more rapidly than the entry of contaminated water into the basin, the suppleness of the basin wall simply permits it to adjust itself to the reduced volume of the basin contents. This of course does not strain the basin wall nor does it alter the elevation of the basin in the reservoir since the suppleness of the basin wall assures the maintenance of the correct balance between volume and buoyancy.

The supply of water in the reservoir 15 is comprised of purified water from the basin 16, along with whatever quantities of fresh water from a lake or the like are necessary to maintain a constant predetermined level in the reservoir. An overflow outlet 32 provides for discharge of purified water from the reservoir and a simple water supply valve 33 controlled by a float 34 regulates the admission of water into the reservoir to maintain the desired water level therein.

From the foregoing description, it will be seen that the water purification method of this invention is characterized by the treatment of contaminated water in the interior of a basin having highly flexible sidewalls that converge downwardly to a localized zone at its bottom, from which zone accumulated sludge can be readily pumped; suspension of the basin in a water filled reservoir wherein the water level is kept constant; and transfer of purified water to the reservoir from a clear water zone near the top of the basin.

In the purification plant shown in FIGS. 3 and 4, the reservoir here denoted by the reference numeral 150 comprises a ground excavation or pit 36, the sidewalls of which are lined with sheeting 37 driven down into the ground. The bottom of the reservoir may be covered with a layer 38 of asphalt if necessary to prevent undue leakage.

The waste or contaminated raw water to be purified is introduced into the plant through a duct 39 which debouches into a dividing channel 40. At this point a grate 41 separates out solid impurities of larger size, and a sand trap 42 of large dimensions slows down the flow of the incoming water. From the trap 42 the incoming water flows through a conduit 43 that leads to a basin 48 which, like the basin 16 is suspended in the water filling the reservoir 150. The conduit 43 discharges into an aeration device 44, mounted in the interior of the basin 48 and consisting of two opposed and telescoped containers 45 and 46, the former positioned concentrically within the latter. The outer container 46 opens downwardly, while the inner container 45 opens upwardly into the inverted outer container. The sidewalls of the two containers are spaced apart to form an annular interspace 47 therebetween.

One or more air inlets (not shown) admit air into the inner container 45.

The waste water overflowing from the top of the inner container passes downwardly through the interspace 47 into the lower portion of the basin 48 where the sludge accumulates. Treated water flows into an overflow trough 49 from the upper portion of the basin 48. The trough 49 encircles the aeration device 44, and a conduit 50 connecting with the trough delivers the treated water into a chamber 51 containing chemicals for effecting flocculation in a manner known per se.

The chamber 51 is located between the basin 48 and a second basin 53 which is also suspended in the reservoir 150 and provides a clarifying receptacle. Water from the flocculation chamber 51 is passed on to the clarifying basin 53 through a conduit 52 which opens to a central distributing tube 54. The tube 54 flares outwardly towards its lower end, and the basin 53 has an overflow trough 55 which encircles the tube 54 and is communicated through a duct 56 with the reservoir 150.

Accordingly, in this embodiment of the invention, the contaminated water is subjected to two purification steps, viz separate biological and chemical purification steps, and it is to a substantial degree free from harmful impurities by the time it is discharged into the reservoir 150.

The basins 48 and 53, like the basin 16, may be provided with flotation collars at their tops, or they may be attached to the sidewalls of the reservoir as shown, or supported in part from the reservoir sidewalls and from footbridges 57 which extend across the reservoir.

Also, like the basin 16, the basins 48 and 53 have converging sidewalls made of thin flexible material such as fabric reinforced polyvinyl chloride, having a thickness of between 0.6 and 0.9 millimeters. In this case, however, the walls of the basins are comprised of flat panels 58 shaped to give the basin the appearance of a truncated but inverted pyramid.

The level of the water in the basins 48 and 53 is maintained only slightly above that of the water in the reservoir 150. Not only does this substantially equalize the internal and external pressure on the basin walls, but it also enables self-drainage of the water serially through the basins 48 and 53 into the overflow 55 in basin 53.

Due to their extreme thinness, the inclined walls of the basins can have a gentle vibratory movement imparted thereto in a simple manner, e.g., by means of compressed air introduced into the water contained in the surrounding reservoir and alongside the basins. This assures that sludge that may have settled on the basin walls will be gently dislodged therefrom to migrate toward the bottoms of the basins.

The sludge collected in the small volume bottom zones of the basins 48 and 53 can be easily pumped therefrom through drawoff tubes 60 that are arranged to discharge into a sludge trough 61 having outlets into each of a pair of mineralizing basins 62. The sludge can thereafter be treated in a conventional manner on sludge drying beds or the like.

The outer basin or reservoir 150, of course, has an overflow 63 to which a discharge conduit 64 is connected.

The plant may also be provided with a superstructure 65 that encloses it to avoid formation of ice in cold climates.

If any impurities should be detected in the outer basin or reservoir 150, due to discharge thereinto of water from the outlet of the basin 53, the water from the reservoir can be returned to the intake of the plant for reprocessing, or to one of the basins. Preferably such recirculation is carried out at night only, when the volume of waste water requiring treatment is low.

The method of water purification carried out in the plant shown in FIGS. 3-5 is similar to that described in connection with the plant disclosed in FIGS. 1 and 2, except that treatment is effected in a way that utilizes two plastic-walled basins suspended in a water-filled artificial reservoir.

While more or less specific embodiments of the invention have been shown and described, those skilled in the art will appreciate that the invention can be embodied in forms other than as herein disclosed for purposes of illustration.

The invention is defined by the following claims:

I claim:

1. A plant for purification of water contaminated by sewerage or the like, characterized by:
   A. means defining a reservoir that contains water substantially free from contaminants;
   B. a basin in which contaminated water is to be treated,
      B. having sidewalls of a nonporous material which is supple enough to be yieldably moved by movements of water in contact therewith, to thereby promote downward migration along the inner surfaces of said walls of sludge that tends to settle on them, and
      B. having its sidewalls converging toward an apexlike localized zone of small volume at the bottom of the basin, to facilitate the removal of accumulated sludge from the bottom of the basin;
   C. means for introducing substantially untreated water into the basin at a level which is spaced below that of water in the reservoir and spaced above the bottom of the basin;
   D. means suspending the basin in the reservoir with the rim of the basin above reservoir water level but with the major portion of the basin sidewalls below said level and thus subject to movement by motion of water in the reservoir and in the basin;

E. means for maintaining substantially uncontaminated water in the reservoir to a depth which is equal to at least a major portion of the height of the basin, the last mentioned means comprising outlet means in the basin at a level above said level at which untreated water is introduced thereinto, for transferring to the reservoir treated water from a high level zone in the basin; and F. a sludge withdrawal duct having an inlet in the basin at a level near the bottom thereof and which is connectable with a suction source to provide for withdrawing accumulated sludge from the bottom of the basin.

2. The water purification plant of claim 1, wherein said outlet means in the basin comprises apertures in its sidewalls at a level below that of water in the reservoir, to prevent floating material in the basin from passing into the reservoir.

3. The water purification plant of claim 1, wherein said means for maintaining substantially uncontaminated water in the reservoir further comprises: a fresh water supply valve for the reservoir; and a float actuator for said valve that is responsive to the level of water in the reservoir.

* * * * *